United States Patent [19]
Ormand et al.

[11] Patent Number: 5,864,006
[45] Date of Patent: *Jan. 26, 1999

[54] METHOD OF MAKING POLYCARBONATE PREPOLYMER AND METHOD OF MAKING HIGH MOLECULAR WEIGHT POLYCARBONATE

[75] Inventors: Michael G. Ormand; Sarat Munjal, both of Lake Jackson, Tex.

[73] Assignee: The Dow Chemical Company, Midland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 823,949

[22] Filed: Apr. 8, 1997

[51] Int. Cl.$^6$ ..................................................... C08G 64/00
[52] U.S. Cl. ............................................. 528/196; 528/198
[58] Field of Search ...................................... 528/196, 198

[56] References Cited

U.S. PATENT DOCUMENTS

| | | | |
|---|---|---|---|
| 4,948,871 | 8/1990 | Fukuoka, et al. ........................ | 528/481 |
| 5,191,001 | 3/1993 | Kuhlig, et al. .......................... | 524/125 |
| 5,204,377 | 4/1993 | Fukawa, et al ........................... | 521/60 |
| 5,214,073 | 5/1993 | Fukawa, et al. .......................... | 521/60 |
| 5,225,526 | 7/1993 | Fukawa, et al. ......................... | 524/119 |
| 5,266,659 | 11/1993 | Sivaram, et al. ....................... | 525/463 |

FOREIGN PATENT DOCUMENTS

| | | |
|---|---|---|
| WO 89-02904 | 4/1989 | Japan . |
| 5310907 | 5/1992 | Japan . |

*Primary Examiner*—Terressa Mosley
*Attorney, Agent, or Firm*—J.M. Mark Gilbreth; Robert W. Strozier; Gilbreth & Strozier, P.C.

[57] ABSTRACT

Polycarbonate prepolymer is crystallized using a water and solvent mixture, or by application of a shear force while heating, or by orientation of the prepolymer with a shear force followed by a temperature hold. High molecular weight polycarbonate is obtained by the solid state reaction of the crystallized prepolymer.

37 Claims, No Drawings

METHOD OF MAKING POLYCARBONATE PREPOLYMER AND METHOD OF MAKING HIGH MOLECULAR WEIGHT POLYCARBONATE

BACKGROUND OF THE INVENTION

1. Field of the Invention

The present invention relates to polymers and to methods of making polymers. In another aspect, the present invention relates to polycarbonate prepolymer, to methods of making such prepolymer, to polycarbonate polymer, and to methods of making such polycarbonate polymer. In even another aspect, the present invention relates to a crystallized polycarbonate prepolymer, to methods of crystallizing polycarbonate prepolymer utilizing a diluent and solvent mixture, utilizing heat with shear generation, or utilizing seeding, to a method making polycarbonate by solid state polymerization, and to polycarbonate made therefrom.

2. Description of the Related Art

Over the last few years, aromatic polycarbonates have found utility in various applications requiring engineering plastics with outstanding heat resistance, impact resistance, and transparency. Due to the popularity of aromatic polycarbonates, much prior art exists with respect to production processes for such aromatic polycarbonates.

The phosgene method

A well known commercially utilized production process is the so-called "phosgene method" involving an interfacial polycondensation process between an aromatic dihydroxy compound such as 2,2-bis(4-hydroxyphenyl) propane (henceforth referred to as bis-phenol A) and phosgene. In the phosgene method, a solvent mixture consisting of water or an aqueous alkali solution and an organic solvent which is not miscible with water is normally used. Commercially, a mixed solvent of aqueous sodium hydroxide and methylene chloride is used. A tertiary amine or a quaternary ammonium compound is used as a polymerization catalyst. The hydrogen chloride formed as a side product is removed in the form of a salt with a base. The weight average molecular weight of the aromatic polycarbonate formed is generally 15,000–70,000 and normally is 16000–40,000.

Unfortunately, the interfacial polycondensation "phosgene process" suffers from many disadvantages as are well known in the literature, examples of which are listed in U.S. Pat. No. 5,204,377.

Transesterification (or-melt) process

Various prior art "transesterification" (also known as "melt") processes are known in which an aromatic polycarbonate is formed from an aromatic dihydroxy compound and diaryl carbonate. As commercially practiced, a polycarbonate is obtained by an ester exchange reaction between bis-phenol A and diphenyl carbonate conducted in a molten state in the presence of a catalyst to release the phenol to produce a polycarbonate. However, in this method, the degree of polymerization of the desired aromatic polycarbonate can not be increased unless phenol and finally diphenyl carbonate are removed by distillation from a highly viscous (8,000–20,000 poise at 280° C.) molten material of the polycarbonate formed.

Unfortunately, the transesterification process also suffers from many disadvantages as are well known in the literature, examples of which are listed in U.S. Pat. No. 5,204,377.

Solid-slate condensation polymerization

Solid-state condensation polymerization has developed as an alternative to the phosgene process and the transesterification process for making polycarbonate.

In solid-state condensation polymerization, a high molecular weight polycarbonate is produced by first preparing a relatively low molecular weight crystallized polycarbonate prepolymer followed by subsequent solid-state polymerization of the crystallized prepolymer.

In general, a solid phase polymerization process is made possible by an ability of a polymer to sustain a solid phase state at temperatures above the glass transition temperature without causing the polymer to fuse (when the temperature for the polymerization is below the glass transition temperature, the polymerization does not take place since the molecular movement is inhibited).

As disclosed in International Patent Application No. PCT/JP88/989, solid-state condensation polymerization could be effectively performed to increase the molecular weight of formed polycarbonate in the production of aromatic polycarbonate from, as starting materials, dihydroxydiaryl alkane, such as bisphenol A, and a diaryl carbonate, such as diphenyl carbonate. As disclosed in PCT/JP88/989, a high quality aromatic polycarbonate in which a substantially amorphous prepolymer having hydroxyl and aryl carbonate groups as terminal groups is crystallized and then subjected to solid-state condensation polymerization.

U.S. Pat. No. 5,266,659, issued Nov. 30, 1993, discloses a solid state process for the preparation of high molecular weight poly(arylcarbonates) from amorphous oligomer. Specifically, the process involves heating in a controlled manner, a BPA-carbonate oligomer in the presence of a catalyst selected from alkali metal aryl acid, alkali metal borohydrial and a quarternary ammonium salt of bioxyanion derived from a carboxylic acid poly(arylcarbonate)s of high molecular weight.

As disclosed in PCT/JP88/989, crystallization is preferably accomplished by either a solvent treatment method or heat crystallization method.

In the solvent treatment method, the prepolymer is crystallized by using a suitable solvent. Examples of suitable solvents include, an aliphatic halogenated hydrocarbon such as chloromethane, methylene chloride, chloroform, carbon tetrachloride, chloroethane, dichloroethane (various isomers), trichloroethane (various isomers), trichloroethylene, and tetrachloroethane (various isomers); an aromatic halogenated hydrocarbon such as chlorobenzene and dichlorobenzene; an ether such as tetrahydrofuran and dioxane; an ester such as methyl acetate and ethyl acetate; a ketone such as acetone, and methyl ethyl ketone; and an aromatic hydrocarbon such as benzene, toluene, and xylene.

Unfortunately the solvent method creates flammability hazzards, results in oligomers, thus requiring an oligomer removal step for acetone recycle. The formed particles can be shattered to a very small size, which can be unacceptable for further polymerization because a typical molecular advancement step utilizes flow of hot nitrogen through a bed of crystallized prepolymer particles. Particles that are too small can then be carried away with nitrogen at moderate nitrogen flow and pressure drop can be excessive due to tight packing of the small particles.

In the heat crystallization method, the prepolymer is heated at a temperature above the glass transition temperature but below the temperature at which the prepolymer begins to melt to crystallize the prepolymer. Crystallization is accomplished simply by maintaining the prepolymer at a specified temperature. As heat crystallization is believed to take too long, there exists a need to reduce the crystallization time.

U.S. Pat. No. 5,204,377, issued Apr. 20, 1993, is directed to a solid-state condensation polymerization process for making polycarbonate. Crystallization is accomplished by a solvent technique in which amorphous prepolymer is treated with solvent under a high shearing force sufficient to reduce the prepolymer to particles having an average particle diameter of 250 microns or less, and a specific surface area of at least 0.2 m$^2$/g and a crystallinity of at least 5%, to thereby crystallize and simultaneously render porous the amorphous prepolymer.

JP 5310907, published Nov. 22, 1993, discloses a method of reducing residual organic solvent content by irradiating solvent-containing polycarbonate and/or polycarbonate oligomer with from 300–30,000 MHZ microwave energy.

However, in spite of these advancements in the prior art, none of these prior art references disclose or suggest the application of a water/solvent mixture, or the application of heat crystallization under shear conditions/ to crystallize polycarbonate prepolymer.

Thus, these is still a need for an improved method of making polycarbonate prepolymer.

There is another need in the art for an improved method of making crystallized aromatic polycarbonate.

These and other needs in the art will become apparent to those of skill in the art upon review of this specification, including its drawings and claims.

SUMMARY OF THE INVENTION

It is an object of the present invention to provide for an improved method of making polycarbonate prepolymer.

It is another object of the present invention to provide for an improved method of making crystallized aromatic polycarbonate.

These and other objects of the present invention will become apparent to those of skill in the art upon review of this specification, including its drawings and claims.

According to one embodiment of the present invention there is provided a method of crystallizing an aromatic polycarbonate prepolymer having a molecular weight in the range of about 1000 to above 20,000, and having in the range of about 5 to about 95 mole percent aryl carbonate terminal end groups based on total end groups. The method generally includes the step of crystallizing the prepolymer with a mixture of solvent and diluent to form crystallized prepolymer. In a more specific embodiment of this embodiment, the prepolymer is first obtained by contacting a dihydroxy aryl compound with a diaryl carbonate to form a polycarbonate prepolymer having a molecular weight in the range of about 1,000 to about 20,000 and having in the in the range of about 5 to about 95 mole percent aryl carbonate terminal end groups based on total end groups.

According to another embodiment of the present invention, there is provided a method of making high molecular weight polycarbonate polymer from a polycarbonate prepolymer, said prepolymer having a molecular weight in the range of about 1,000 to above 20,000, and said prepolymer having in the range of about 5 to about 95 mole percent aryl carbonate terminal end groups based on total end groups. The method first includes crystallizing the prepolymer with a mixture of solvent and diluent to form crystallized prepolymer. The method also includes the step of heating the crystallized prepolymer to a reaction temperature greater than the prepolymer glass transition temperature less 50° C. and suitable to maintain the crystallized prepolymer in a solid phase state throughout the solid phase during the formation of high molecular weight polycarbonate. In a more specific embodiment of this embodiment, the prepolymer is first obtained by contacting a dihydroxy aryl compound with a diaryl carbonate to form a polycarbonate prepolymer having a molecular weight in the range of about 1,000 to about 20,000 and having in the in the range of about 5 to about 95 mole percent aryl carbonate terminal end groups based on total end groups.

According to even another embodiment of the present invention, there is provided a method of crystallizing an aromatic polycarbonate prepolymer having a molecular weight in the range of about 1,000 to above 20,000, and having in the range of about 5 to about 95 mole percent aryl carbonate terminal end groups based on total end groups. The method generally includes crystallizing the prepolymer by application of a shearing force and at a temperature between the prepolymer glass transition temperature and the prepolymer melt temperature. In a more specific embodiment of this embodiment, the prepolymer is first obtained by contacting a dihydroxy aryl compound with a diaryl carbonate to form a polycarbonate prepolymer having a molecular weight in the range of about 1,000 to about 20,000 and having in the in the range of about 5 to about 95 mole percent aryl carbonate terminal end groups based on total end groups.

According to still another embodiment of the present invention there is provided a method of making high molecular weight polycarbonate polymer from a polycarbonate prepolymer, said prepolymer having a molecular weight in the range of about 1,000 to above 20,000, and said prepolymer having in the range of about 5 to about 95 mole percent aryl carbonate terminal end groups based on total end groups. The method generally includes crystallizing the prepolymer by application of a shearing force and at a temperature between the prepolymer glass transition temperature and the prepolymer melt temperature. The method further includes heating the crystallized prepolymer to a reaction temperature greater than the prepolymer glass transition temperature less 50° C. and suitable to maintain the crystallized prepolymer in a solid phase state throughout the solid phase during the formation of high molecular weight polycarbonate. In a more specific embodiment of this embodiment, the prepolymer is first obtained by contacting a dihydroxy aryl compound with a diaryl carbonate to form a polycarbonate prepolymer having a molecular weight in the range of about 1,000 to about 20,000 and having in the in the range of about 5 to about 95 mole percent aryl carbonate terminal end groups based on total end groups.

According to yet another embodiment of the present invention there is provided a method of crystallizing an aromatic polycarbonate prepolymer having a molecular weight in the range of about 1,000 to above 20,000, and having in the range of about 5 to about 95 mole percent aryl carbonate terminal end groups based on total end groups. The method generally includes the step of applying a shearing force to the prepolymer to form oriented prepolymer. The method further includes heating the oriented prepolymer to a temperature between the prepolymer glass transition temperature and the prepolymer melt temperature to crystallize the prepolymer. In a more specific embodiment of this embodiment, the prepolymer is first obtained by contacting a dihydroxy aryl compound with a diaryl carbonate to form a polycarbonate prepolymer having a molecular weight in the range of about 1,000 to about 20,000 and having in the in the range of about 5 to about 95 mole percent aryl carbonate terminal end groups based on total end groups.

According to even still another embodiment of the present invention there is provided a method of making high molecular weight polycarbonate polymer from a polycarbonate prepolymer, said prepolymer having a molecular weight in the range of about 1,000 to above 20,000, and said prepolymer having in the range of about 5 to about 95 mole percent aryl carbonate terminal end groups based on total end groups. The method generally includes applying a shearing force to the prepolymer to form oriented prepolymer. The method also includes heating the oriented prepolymer to a temperature between the prepolymer glass transition temperature and the prepolymer melt temperature to form crystallized prepolymer. The method even further includes heating the crystallized prepolymer to a reaction temperature greater than the prepolymer glass transition temperature less 50° C. and suitable to maintain the crystallized prepolymer in a solid phase state throughout the solid phase during the formation of high molecular weight polycarbonate. In a more specific embodiment of this embodiment, the prepolymer is first obtained by contacting a dihydroxy aryl compound with a diaryl carbonate to form a polycarbonate prepolymer having a molecular weight in the range of about 1,000 to about 20,000 and having in the in the range of about 5 to about 95 mole percent aryl carbonate terminal end groups based on total end groups.

DETAILED DESCRIPTION OF THE INVENTION

In one embodiment, the present invention provides for a method of crystallizing polycarbonate prepolymer. In another embodiment, the present invention provides for a method a obtaining high molecular weight aromatic polycarbonate.

It is expected that the polycarbonate prepolymer crystallization step of the present invention may be incorporated into the prior art methods of making polycarbonate prepolymer, that is, the crystallization step of the present invention may be substituted for the crystallization step in prior art methods. Once the crystallized prepolymer is obtained by the method of the present invention, the prior art methods of making high molecular weight aromatic polycarbonate from prepolymer may be utilized. Therefore, the methods of making polycarbonate prepolymer and obtaining high molecular weight aromatic polycarbonate therefrom disclosed in U.S. Pat. No. 5,204,377 and in WO 89-02904, are herein incorporated by reference.

According to the present invention, a basically non-crystalline pre-polymer with a relatively low molecular weight is obtained by a preliminary polymerization of reactants (a) a dihydroxy diaryl compound and (b) a diaryl carbonate.

The unique crystallization step of the present invention may be carried out in a water/solvent mixture, alternatively by the application of heat crystallization under shear conditions, or alternatively by the application of shear conditions followed by a static hold at a crystallization temperature.

Once the pre-polymer is crystallized, a solid phase polymerization reaction proceeds easily when the crystallized pre-polymer is heated at a temperature below the crystalline melting point, in other words, at a temperature capable of maintaining the crystallized pre-polymer in a solid phase state. According to the type of properties desired in the end product, the high molecular weight aromatic polycarbonate may be produced by one or more of restricting the molecular weight of the pre-polymer, the proportion of the terminal groups, and the degree of crystallization of the crystallized pre-polymer to a specific range.

Preliminary Polymerization Step To Make Prepolymer

It should be understood that any suitable method of making the prepolymer, including catalytic and non-catalytic methods, may be utilized in the present invention. The following is merely an illustration of one such suitable method.

A mixture of a dihydroxy diaryl compound and a diaryl carbonate is heated in this step (henceforth referred to as the "preliminary polymerization step") to yield a prepolymer. Generally, the prepolymer will have a weight average molecular weight (MW) sufficient so that the prepolymer may be crystallized. While any suitable degree of crystallinity may be obtained, it is preferable that the crystallinity be in the range of about 10 to about 12 percent to allow for ease of processing without sticking of the solid state particles. Preferably, this means that the molecular weight weight average will be at least about 500, more preferably in the range of about 1,000 to about 20,000, and even more preferably in the range of about 6,000 to about 8,000.

The suitable prepolymer will also generally comprise in the range of about 5 to about 95 mole percent terminal aryl carbonate groups based on total terminal end groups. Preferably, the prepolymer will comprise in the range of about 10 to about 90 mole percent terminal aryl carbonate groups based on total terminal end groups, more preferably in the range of about 10 to about 90 mole percent, even more preferably in the range of about 20 to about 80 mole percent, and still more preferably in the range of about 40 to about 90 mole percent terminal aryl carbonate groups based on total terminal end groups.

The dihydroxy diaryl compound suitable for use as a raw material in a process of this invention comprises a dihydroxy diaryl alkane represented by the general formula (I):

HO—Ar1—Y—Ar2—OH          (I)

wherein Ar1 and Ar2 are each independently divalent carbon ring type or heterocyclic aromatic group having in the range of about 5 to about 30 carbon atoms, and Y represents a divalent alkane group having in the range of about 5 to about 30 carbon atoms.

Each of the divalent aromatic groups Ar1 and Ar2 may be unsubstituted or substituted with at least one substituent, which substituents must not have an undue adverse effect on the reaction or subsequent crystallization. Non-limiting examples of suitable substitutes include a halogen atom, an alkyl group having from 1 to 10 carbon atoms, an alkoxy group having from 1 to 10 carbon atoms, a phenyl group, a phenoxy group, a vinyl group, a cyano group, an ester group, an amide group, and a nitro group.

Specific preferred examples of the heterocyclic aromatic groups used in this invention include aromatic groups containing one or a multiple of ring forming nitrogen atoms. In general the presence of other ring forming hetero atoms is not necessary. The divalent aromatic group is represented by, for example, substituted or unsubstituted phenylene, substituted or unsubstituted naphthylene, substituted or unsubstituted biphenylene, and substituted or unsubstituted pyridylene. Here the substituents listed earlier may by present.

The divalent alkane group may be an organic group represented, for example, by the general formulae below.

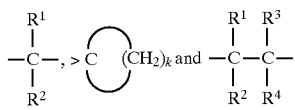

wherein R1, R2, R3, and R4 are each independently hydrogens, low molecular weight alkyl groups, low molecular weight alkoxy groups, cycloalkyl groups with 5–10 ring constructing carbon atoms, carbon ring type aromatic group with 5–10 ring constructing carbon atoms, and carbon ring type aryl alkyl group with 6–10 carbon atoms, and wherein k is an integer from 3 to 11.

It is preferable to use a compound represented by the general formula below as the dihydroxy diaryl alkane.

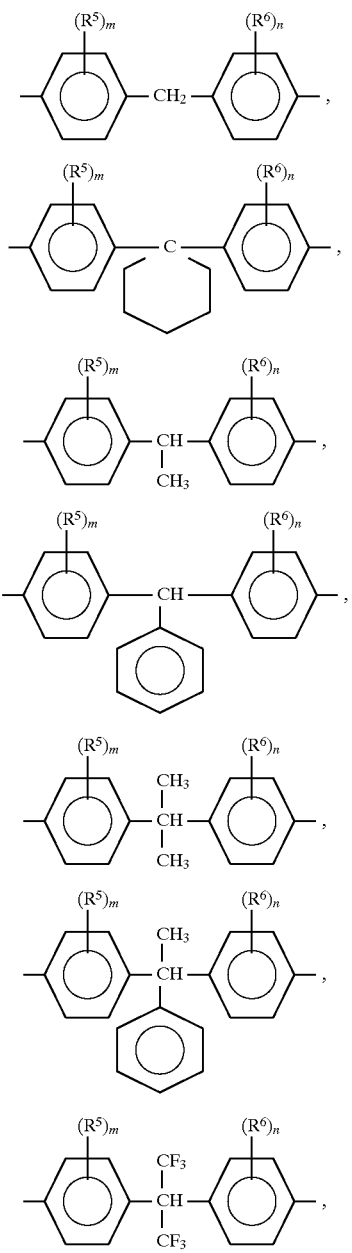

wherein R5 and R6 are each independently hydrogen atoms, halogen atoms, an alkyl group having 1 to 10 carbon atoms, an alkoxy group having from 1 to 10 carbon atoms; a cycloalkyl group with 5 to 10 ring carbon atoms or phenyl groups, each of m and n is independently an integer from 1 to 4; when m is an integer from 2 to 4, each R5 may be identical to each other or different from each other, when n is an integer from 2 to 4 each R6 may be identical to or different from each other Preferred examples include bis-phenol A which is 2,2-bis-(4-hydroxy phenyl) propane and substituted bis-phenol A's. In addition, these dihydroxy diaryl alkanes may be used alone or in a combination of at least two. When more than two of the dihydroxy diaryl alkane compounds are used, an aromatic polycarbonate of a copolymer containing more than two carbon skeletons is normally obtained.

In addition to comprising the above dihydroxy diaryl alkanes, the dihydroxy diaryl compound may optionally comprise generally up to 50 mole percent, preferably up to 15 mole percent of a dihydroxy diaryl derivative other than the dihydroxy diaryl alkanes.

The structure of the said dihydroxy diaryl derivatives is not particularly limited, but a structure represented by the formula (II) below is preferred.

$$HO—AR1—Z—AR2—OH \quad (II)$$

wherein where Ar1 and Ar2 are as defined earlier, and Z is a bond or —O—, —CO—, —S—, —SO$_2$—, —SO—, and —CON(R1)—, wherein R1 represents a divalent group as defined earlier above.

Examples of suitable dihydroxy diaryl alkanes include compounds represented by the general formula below.

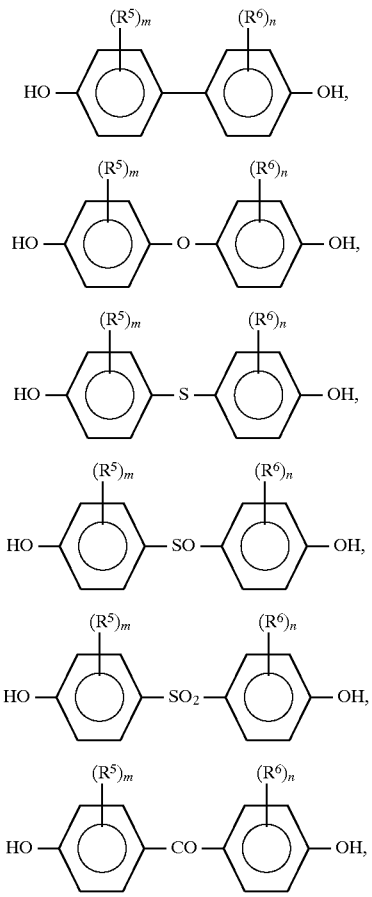

-continued

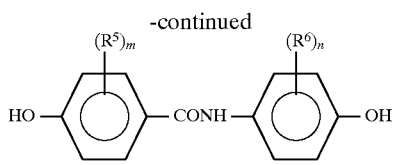

wherein R5, R6, m and n are as defined earlier.

In addition, it is possible to add about 0.01 to about 3 mole percent (based on dihydroxy compound) of a compound containing at least three phenolic hydroxy groups per molecule to a dihydroxy diaryl compound based on the dihydroxy diaryl compound. Non-limiting examples of compounds containing at least three phenolic hydroxyl groups in a molecule include fluoroglucine, fluoroglucide, 4,6-dimethyl-2,4,6-tri(4'-hydroxyphenyl)-heptane-2,2,6-dimethyl-2,4,6-tri(4'-hydrophenyl)-heptene-3,4,6-dimethyl-2,4,6-tri(4'-hydroxyphenyl)-heptane, 1,3,5-tri(4'-hydroxyphenyl)-benzene, 1, 1, I -tri-(4'-hydroxyphenyl)-ethane, 2,2-bis-[4,4-bis(4'-hydroxyphenyl) cyclohexyl-propane, 2,6-bis-(2'-hydroxy-51 methyl-benzyl)-4-methyl phenol, 2,6-bis-(2'-hydroxy-5'-isopropyl benzyl)-4-isopropyl phenol, bis-L2-hydroxy-3-(2'-hydroxy-5'-methyl benzyl)-5-methylphenyl] methane, tetra-(4-hydroxyphenyl) methane, tri-(4-hydroxyphenyl) phenylmethane, bis(2,4-dihydroxyphenyl) ketone, 1,4-bis-(4',4"-dihydroxytriphenyl methyl) benzene, 1 ,4-dimethyl- 1 ,4-bis(4'-hydroxy-3-methylphenyl)-6-hydroxy-7-methyl 1,2,3,4-tetralin, and 2,4, 6-tri(4'-hydroxybenylamine)-S-triazine.

The diaryl carbonate utilized in the present invention is a carbonic acid ester of an aromatic monohydroxyl compound represented by the general formula (III) below.

In formula (III), Ar3 and Ar4 are each independently monovalent carbon ring type or heterocyclic type aromatic groups. In the aforementioned Ar3 and Ar4, more than one of the ring hydrogen atoms may be substituted with other substituents which do not have an adverse effect on the reaction. For example, more than one hydrogen may be substituted with halogen atoms, alkyl groups having from 1 to 10 carbon atoms, alkoxy groups having from 1 to 10 carbon atoms, phenyl groups, phenoxy groups, vinyl groups, cyano groups, ester groups, amide groups, and nitro groups.

The representative examples of the monovalent aromatic groups are phenyl group, naphthyl group, biphenyl group, and pyridyl group. These examples may be substituted with more than one of the substituents described above.

The representative examples of the diaryl carbonate are substituted or unsubstituted diphenyl carbonates represented by the general formula below:

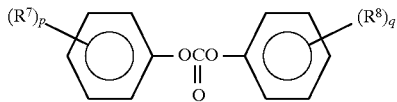

wherein R7 and R8 are each independently hydrogen atoms, halogen atoms, alkyl groups with 1 to 4 carbon atoms, low molecular weight alkoxy groups with 1 to 4 carbon atoms, cycloalkyl groups with 5 to 10 ring constructing carbon atoms or phenyl groups, and p and q are integers between 1 and 5, where when p is greater than two, each R7 is different from each other and when q is greater than two, each R8 is different from each other.

Of these diphenyl carbonates, symmetrical diaryl carbonates such as diphenyl carbonates, ditolyl carbonates, and di-t-butylphenyl carbonates, which are low molecular weight alkyl substituted diphenyl carbonates, are preferred. However, diphenyl carbonate, which is a diaryl carbonate with the simplest structure, is ideal for the purpose and is thus preferred.

These diaryl carbonates may be used alone, and may also be used in a combination of two or more. However, as the reaction system may under certain reaction conditions become complex when two or more diaryl carbonates are used, it is preferred to use one symmetrical diaryl carbonate.

In the preliminary polymerization step, a mixture of a dihydroxy diary] compound and a diaryl carbonate is heated to form a pre-polymer while releasing an aromatic monohydroxyl compound consisting of a compound based on a diaryl carbonate where aryl group is bonded to a hydroxyl group.

The weight average molecular weight of the pre-polymer produced in this preliminary polymerization step is generally in the range of about 1,000 to about 20,000, preferably in the range of about 1,500 to about 13,000, more preferably in the range of about 4,000 to about 10,000, and even more preferably in the range of about 6,000 to about 8,000. When the weight average molecular weight of the prepolymer is too low, the reaction time for the solid phase polymerization process becomes too long which is not desirable. If the weight average molecular weight of the prepolymer is too high crystallization becomes difficult. While it may be utilized, there is no special merit in making the weight average molecular weight greater than about 20,000, and there is no benefit to the solid phase polymerization step. The weight average molecular weight of the prepolymer can be conveniently controlled by those of skill in the art through reaction conditions such as temperature, time, pressure, monomer ratio and agitation, as well as any other conditions or factors.

It is preferable for the said preliminary polymerization reaction to be conducted in a molten state. The melt viscosity of a prepolymer with a weight average molecular weight in the specified range is not too high and is readily adaptable solid state polymerization. Naturally, a solvent inert to the reaction may be used in conducting this preliminary polymerization process. For example, methylene chloride, chloroform, 1,2-dichloroethane, tetrachloroethane, dichlorobenzene, tetrahydrofuran, diphenyl methane, and diphenyl ether may be used. Preferably, this preliminary polymerization reaction is carried out in the absence of a solvent or in a molten state.

The ratio of the diaryl carbonate and dihydroxy diaryl compound used in the preliminary polymerization reaction varies according to the type of the diaryl carbonate and dihydroxy diaryl compound used, reaction temperature, and other reaction conditions. However, the said diaryl carbonate is normally used in the range of about 0.5 to about 2.5 moles, preferably in the range of about 0.95 to about 2.0 moles, more preferably in the range of about 1.01 to about 1.5 moles to one mole of the dihydroxy diaryl compound.

The ends of the pre-polymer chains obtained in this manner may be, for example, in the form of a terminal aryl carbonate group represented by the general formula

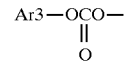

wherein Ar3 is as defined above, or in the form of a terminal hydroxyl group based on a dihydroxy diaryl compound represented by the general formula HO—Ar3, wherein Ar3 is as defined above.

Although the reaction temperature and reaction time when executing a preliminary polymerization step vary according to the types and amount of the dihydroxy diaryl compound and diaryl carbonate used as raw materials, type and amount of a catalyst used as needed, desired degree of polymerization of the prepolymer obtained, and other reaction conditions, normally, the preliminary polymerization step is carried out at temperatures ranging from about 50° C. to about 350° C., preferably in the range of about 100° C. to about 320° C., more preferably in the range of about 150° C. to about 280° C., and for reaction times in the range of about 1 minute to about 100 hours, preferably in the range of about two minutes to about ten hours, more preferably in the range of about several minutes to about several hours.

In the preliminary polymerization reaction step, an aromatic monohydroxy compound is formed as the reaction proceeds, and this is a compound in which an aryl group based on a diaryl carbonate is bonded to a hydroxyl group. By removing this compound from the reaction system, the rate of the reaction is accelerated. Therefore it is preferable to effectively agitate the reaction while introducing an inert gas such as nitrogen, argon, helium, and carbon dioxide or a low molecular weight hydrocarbon gas to remove with it the said aromatic monohydroxy compound formed. It is also acceptable to conduct the reaction under reduced pressure or to combine the two methods to accomplish the same objective.

This preliminary polymerization reaction can be conducted without adding a catalyst, and this is a particularly preferred mode of executing the reaction. However, a polymerization catalyst may be used as needed to accelerate the rate of polymerization. The polymerization catalyst used in the practice of the present invention is not particularly restricted as long as it is a polycondensation catalyst as is used in this field. Non-limiting examples of suitable catalysts are provided in U.S. Pat. Nos. 5,204,377 and WO 89-02904, both herein incorporated by reference.

Crystallization Step

The prepolymer may be crystallized from a mixture of solvent and diluent, crystallized by subjecting the prepolymer to a shearing force while it is heated to a temperature in the range of near its glass transition temperature to less than its degradation temperature, or crystallized by first shearing the prepolymer and then holding it at a temperature between near its glass transition temperature and less than its degradation temperature.

Solvent and Diluent Crystallization

In the solvent and diluent treatment method, the prepolymer is crystallized by using a suitable mixture of solvent and diluent.

A first embodiment of the solvent and diluent treatment method includes dissolving the prepolymer in a mixture of solvent and diluent, and then separating crystalline prepolymer from the solution. This separation is accomplished by, for example, removing the solvent by evaporation or by adding a poor solvent for the prepolymer to the solution.

In another embodiment of this solvent and diluent treatment method, a suitable mixture of diluent and a solvent which is a poor solvent for the prepolymer is used, and the said prepolymer is brought into contact with the solvent in either a liquid or vapor state for a necessary duration of time. The poor solvent has a prepolymer solubility of less than about 10%, and the solvent penetrates the prepolymer. The amount of time needed to crystallize the prepolymer by penetrating the solvent into the prepolymer varies with the type and molecular weight of the prepolymer, shape, type of solvent used, and treatment temperature. However, normally, several seconds to several hours is utilized. A treatment temperature in the range of about −10° C. to about 200° C. is normally utilized.

The diluent serves to slow down the action of the solvent so that crystallization is slowed down. A non-limiting preferred example of a suitable diluent is water.

Non-limiting examples of solvents useful in the present invention for crystallizing the amorphous prepolymer include aliphatic halogenated hydrocarbons, such as methyl chloride, methylene chloride, chloroform, carbon tetrachloride, chloroethane, dichloroethane (various isomers), trichloroethane (various isomers), trichloroethylene, and tetrachloroethane (various isomers); aromatic halogenated hydrocarbons, such as chlorobenzene and dichlorobenzene, ethers such as tetrahydrofuran and dioxane, esters such as methyl acetate and ethyl acetate, ketones such as acetone, and methyl ethyl ketone, and aromatic hydrocarbons such as benzene, toluene, and xylene. Preferred solvents include ethers such as tetrahydrofuran and dioxane, esters such as methyl acetate and ethyl acetate, ketones such as acetone, and methyl ethyl ketone. The most preferred solvent is acetone. Any of these solvents may be used alone or as a mixture of any suitable combination of the above.

The volume of a solvent used in the solvent treatment of a prepolymer varies with the type of the prepolymer and solvent involved, necessary degree of crystallization, and treatment temperature, but normally, 0.05–100 fold excess by weight or preferably about 0.1 to about 50 fold excess by weight based on the prepolymer weight is used.

The weight ratio of water to solvent utilized is in the range of about 5:95 to about 95:5, preferably in the range of about 20:80 to about 80:20, and more preferably in the range of about 30:70 to about 50:50.

Heat Crystallization

In the heat crystallization method, the prepolymer is subjected to a shearing force while being heated to a temperature between near (i.e., about 50° C. below) its glass transition temperature ($T_g$) but below its degradation temperature to crystallize the prepolymer. The optimum crystallization temperature will vary according to the molecular weight of the prepolymer. In this method the prepolymer is crystallized by maintaining it at a specified temperature while applying a shearing force. Generally, this temperature is in the range of $T_g-50°$ C. to about 350° C., preferably in the range of about $T_g-50°$ C. to about 300° C., more preferably in the range of about $T_g-50°$ C. to about $T_g+100°$ C., and most preferably in the range of about $T_g-50°$ C. to about $T_g+50°$ C.

The shearing force must be suitable to induce crystallization and orient or align the polymer chains. Generally, shear rates will be in the range of about 1 to 10,000 cycles/second, preferably in the range of about 50 to about 5000 cycles/second, and more preferably in the range of about 100 to about 500 cycles/second.

The shearing is carried out for a shearing time suitable to induce crystallization and orient or align the polymer chains. Generally, the shearing time is in the range of about 0.1 seconds to about 24 hours, preferably in the range of about 0.1 minutes to about 2 hours, more preferably in the range of about 0.2 minutes to about 15 minutes, and most preferably in the range of about 0.5 minutes to about 3 minutes.

Shearing may be accomplished by any suitable batch or continuous method utilizing any suitable apparatus. Non-limiting examples of suitable apparatus include stirred tank, extruder, static mixer or heat exchanger.

As described earlier, the temperature, $T_c$ (°C.) at which heat crystallization is conducted is not particularly restricted as long as it is near the glass transition temperature of the desired aromatic polycarbonate and is below the melting temperature, Tm (°C.) or degradation temperature of the prepolymer. However, the rate of crystallization of the prepolymer is slow at low temperatures, and the particularly preferred heat crystallization temperature, $T_c$ is generally between $T_g$ and $T_m$.

The heat crystallization of the prepolymer may be carried out by maintaining a constant temperature within the aforementioned ranges or by changing the temperature continuously or intermittently within those ranges. In another embodiment, the temperature is increasing during the heat crystallization, preferably at a constant rate. In even another embodiment, where multiple crystallization vessels are involved, different temperatures may be utilized in each vessel, preferably increasing from one vessel to the next along the process path. In still another embodiment, the temperature will increase with increasing molecular weight of the reaction mixture.

The duration of the heat crystallization process varies according to the chemical composition of the prepolymer, whether or not a catalyst is used, crystallization temperature, and the mode of crystallization. The crystallization time is normally in the range of about 0.1 seconds to about 200 hours, preferably in the range of about 1 hour to about 24 hours, more preferably in the range of about 1 hour to about 5 hours, and even more preferably in the range of about 1 hour to about 3 hours.

Shearing Followed by Temperature Hold

In still another crystallization embodiment, shearing may be applied as described above, followed by a temperature hold step as described above.

Optional Crystallization Embodiment using Seed Crystals

In a further optional embodiment of all three of the above crystallization techniques, seed particles may be utilized to assist in the crystallization. The seed particles utilized will generally be in the range of about 1 μm to about 5000 μm in diameter, preferably in the range of about 75 μm to about 200 μm in diameter. Seed particles will generally be utilized in a concentration suitably high to assist in crystallization, yet not so high as to cause excessive (i.e., uneconomic) recycle. Generally seed particle concentration will range from about 1 to about 50 weight percent based on the weight of the prepolymer, preferably in the range of about 2 to about 30 weight percent, and more preferably in the range of about 5 to about 20 weight percent.

The success of the crystallization process can be readily ascertained by the fact that the prepolymer is no longer transparent, but it can also be confirmed by X ray diffraction analysis or DSC.

A noncrystalline prepolymer is crystallized by the crystallization process described, but the extent of crystallization varies according to the type of dihydroxy diaryl compound and diaryl carbonate used as starting materials, degree of polymerization of the prepolymer, the presence or absence of a catalyst, and crystallization conditions. The degree of crystallization achieved is normally in the range of about 3% to about 75%, preferably in the range of about 5% to about 55%, and more preferably in the range of about 10% to about 45%. The degree of crystallization is measured by X-ray diffraction or DSC, and may be measured as disclosed in U.S. Pat. No. 5,204,377 or WO 89-02904, both herein incorporated by reference.

Solid State Polymerization

A crystallized prepolymer with a degree of crystallization in the range specified above can be converted to a high molecular weight polymer by using the solid phase polymerization process as is well known in the art.

A crystallized prepolymer is subjected to solid phase polymerization by maintaining the prepolymer in a solid phase state by keeping the temperature below the melting temperature to yield a high molecular weight aromatic polycarbonate.

In the solid phase polymerization process, the polycondensation is thought to proceed through two main types of reactions involving two types of terminal groups present in a crystallized prepolymer. The two types of terminal groups are terminal aryl carbonate group and terminal hydroxyl group. In other words, the terminal hydroxyl group react with a terminal aryl carbonate group to proceed with a polycondensation reaction while releasing an aromatic monohydroxy compound formed by bonding of a hydroxyl group on the aryl group of a diaryl carbonate. In addition, the terminal aryl carbonate group reacts with another terminal aryl carbonate group to proceed with a polycondensation reaction while releasing a diaryl carbonate. The latter is a self condensation reaction. In the temperature range where solid phase polymerization is allowed to take place, the reaction rate of the polycondensation which releases an aromatic monohydroxy compound was found to be several times to several tens of times faster than the rate of the polycondensation which releases a diaryl carbonate.

Therefore, since the crystallized prepolymer has a terminal aryl carbonate group content higher than the terminal hydroxyl group content, the terminal hydroxy group content is reduced to a very low level when the molecular weight reaches the desired level. Although the terminal hydroxyl group content of an aromatic polycarbonate produced varies with the molecular weight of the crystallized prepolymer used, amount of the terminal aryl carbonate group, temperature of the solid phase polymerization, solid phase polymerization time, solid phase polymerization method and other solid phase polymerization conditions it is generally less than about 0.1 weight percent, preferably less than about 0.03 weight percent, and more preferably less than about 0.01 weight percent based on the finished polymer weight. An aromatic polycarbonate with a very low terminal hydroxyl group content can be easily obtained.

In the solid phase polymerization process, the process is accelerated by removing an aromatic monohydroxy compound and/or diaryl carbonate formed as by products from the system. For this reason, an inert gas such as nitrogen, argon, helium, and carbon dioxide or a low molecular weight hydrocarbon gas is introduced to remove the diaryl carbonate or aromatic monohydroxy compound along with the gas when it exits from the system and/or the reaction is conducted under reduced pressure. When a gas is introduced into the reaction, it is preferable to heat the gas to a temperature close to the reaction temperature before introducing it to the system.

Although the shape of the crystallized prepolymer used to execute the solid phase polymerization reaction is not particularly restricted, it is noted that large masses react slowly and are difficult to handle, and that pellets, beads, granules, and powder are better suited shapes. In addition, the solid prepolymer obtained by the crystallization may be sized suitable for the solid phase polymerization process, by for example, extrusion and die face cutting.

The reaction temperature, Tp (°C.), and reaction time for executing the said solid phase polymerization reaction varies with the type and shape of the crystallized prepolymer (chemical structure and molecular weight), the presence or absence of a catalyst in the crystallized prepolymer, type and amount of the catalyst, type and amount of the catalyst subsequently added as needed, extent of crystallization in the crystallized prepolymer, melting temperature, Tm (°C.), necessary degree of polymerization for the desired aromatic polycarbonate, and other reaction conditions.

However, it is noted that it is necessary to maintain the temperature at above the glass transition temperature of the crystallized prepolymer while maintaining the crystallized prepolymer in a solid phase state throughout the solid phase polymerization process. It is preferable to conduct the solid phase polymerization reaction by maintaining the temperature of the reaction system in a range specified by the equation below for at least about 1 second to about 100 hours, preferably in the range of about 0.1 hours to about 50 hours.

$$Tm-50<Tp<Tm$$

wherein Tp and Tm are as defined earlier.

Alternatively, the reactants could be heated to specified temperatures in a programmed manner, as is disclosed in U.S. Pat. No. 5,266,659, to Sivaram et al., herein incorporated by reference.

As a non-limiting example, a suitable temperature for bis-phenol A polycarbonate is generally in the range of about 150° C. to about 260° C., preferably in the range of about 180° C. to about 250°.

It is desirable to agitate the reaction mixture effectively in the solid phase polymerization process in order to heat the polymer as uniformly as possible during the polymerization reaction and to promote extraction of the aromatic monohydroxy compound and diaryl carbonate formed by a side reaction. The agitation process may be conducted mechanically, for example, through agitator blades or by using a reactor in which the reactor itself is built to rotate or agitate, or by the flow of a gas used to heat the reaction system.

Furthermore, when a prepolymer is crystallized by a heat crystallization process, the pressure in the reaction system may be reduced after the prepolymer reaches the designated degree of crystallization, or a gas for heating may be introduced to remove the aromatic monohydroxy compound and diaryl carbonate from the system to conduct a solid phase polymerization process.

While the solid phase polymerization reaction may proceed at a satisfactory rate without adding a catalyst, a catalyst may optionally be added to increase the reaction rate. In some instances, a suitable amount of residual catalyst left over from the preliminary polymerization process may be present in the prepolymer formed. Suitable catalysts include those suitable for making prepolymer referred to above, in amounts similar to that used in the preliminary polymerization process.

In general, aromatic polycarbonate produced by the present invention may have any desired weight average molecular weight. Generally, the molecular weight will be in the range of about 5,000 to about 200,000, preferably in the range of about 10,000 to about 50,000, more preferably in the range of about 15,000 to about 40,000.

The shape of the aromatic polycarbonate produced by this solid phase polymerization depends upon the shape of the crystallized prepolymer used, but it is normally bead, granules, or powder commonly referred to as bulk material. The degree of crystallization of the aromatic polycarbonate obtained by a solid phase polymerization reaction of a crystallized prepolymer is normally higher than that of the crystallized prepolymer.

The high molecular weight crystallized aromatic polycarbonate bulk material of the present invention may be pelletized without cooling by introducing it into an extruder without any further treatment or can be molded without cooling in a direct molding machine.

Non-limiting examples of reactors suitable for use in the present invention include batch type, continuous type or a combination thereof for any of the steps including preliminary polymerization, crystallization and solid phase polymerization.

EXAMPLES

The following Examples are provided merely to illustrate the invention, and are not intended to and do not limit the scope of the claims of the invention. The following analysis methods are used in the examples.

Differential Scanning Calorimetry (DSC) is done using a Du Pont Instruments 912 Differential Scanning Calorimeter controlled by the TA Instruments Thermal Analyst 2100. Percent crystallinity is calculated based on the polycarbonate 100% crystalline enthalpy of melting of 110 Joules per gram. The heating profile for prepolymer analysis is 10° C. per minute from 25° C. to 250° C. The reported crystallinity is net crystallinity which is the crystallinity determined from the melt endotherm minus the crystallinity determined from the crystallization exotherm generated during the DSC run.

Extracted oligomer content is determined gravimetrically. Molecular weight and polydispersity are determined using gel permeation chromatography. Hydroxyl endgroup content is determined using gel permeation chromatography and ultraviolet/visible spectrophotometry.

Example 1
(liquid acetone crystallization)

Prepolymer was prepared as is known in the art. 750 grams of bisphenol-A is added to 750 grams of diphenylcarbonate and the mixture is melted by heating to 150° C. 1.5E-3 gram of lithium hydroxide in 1 ml of 90 wt % aqueous phenol is added to the mixture and the temperature is raised to 220° C. The mixture is allowed to equilibrate for 15–20 minutes. The pressure is then gradually decreased. The rate of decrease is adjusted to prevent foaming and excessive fall in reactor temperature. After the final pressure is reached the prepolymer is allowed to equilibrate for 10 minutes in order to obtain 2000–6000 MW prepolymer. The prepolymer is removed from the reactor and cooled under a nitrogen purge.

The prepolymer was crushed in a Strauβ shear plate mill and then sieved to obtain particles with sizes of 1 to 1.5 mm in diameter. An amount of 5 to 10 grams of the particles are placed in 20 to 40 grams of acetone and stirred for 30 minutes. The particles immediately shattered into 25 to 50 micron size particles with some particles agglomerating into clumps up to 3 to 5 mm in diameter. The particles achieved 24 % crystallinity as determined by DSC.

Example 2
(aqueous acetone crystallization)

Prepolymer, prepared as in Example 1, was crushed in a Strauβ shear plate mill and then sieved to obtain particles of 0.5 to 1 mm in diameter. 25 grams of the particles are placed in 125 grams of water and stirred while 582 grams of 85 wt % aqueous acetone solution is gradually added so that the particles do not shatter or agglomerate. The particles are stirred until 15–18% crystallinity is achieved as determined by DSC. The extracted oligomers in the solution was found to be 0.5 wt % based on total prepolymer amount. No particle shattering was observed.

Example 3
(comparison to prior art JP2000163, pp. 116–117)

The prepolymer was prepared similar to that in Example 1. Ten grams of prepolymer are melted at 240° C. and added over the course of an hour to a Waring blender acetone batch containing 12 kg of acetone at 40°–50° C. and stirred with blades at 500 rpm. The prepolymer is reduced to powder and is 29% crystallized. The extracted oligomers content is 4 wt % based on total prepolymer amount.

Example 4
(heat crystallization in DSC-no shear)

The prepolymer was prepared as in Example 1 to achieve 6000 MW. The prepolymer was crushed in a Strauβ shear plate mill and then sieved to obtain particles of 1 cm nominal diameter. The crushed prepolymer had no detectable crystallinity as determined by DSC.

The prepolymer is further crushed and sieved to obtain particles of 1–1.5 mm in diameter. DSC is used to determine the optimum crystallization temperature of 170° C. Fifteen milligrams of the particles are placed in an unsealed test pan and placed in the DSC. The particles were quickly (>70° C./min) heated to 170° C., held for 60 minutes and then quenched. Then the same particles were analyzed using DSC to obtain percent crystallinity. Similar runs were done on 19 and 17 mg of particles for holding times of 90 and 120 minutes, respectively. For 60, 90, and 120 minutes of holding time, the % crystallinity values were 7, 14, and 19%, respectively.

Example 5
(heat crystallization with shear in a Haake rheometer)

The prepolymer was prepared and 1 cm nominal diameter particles obtained as in Example 4. 20 grams of the particles were placed in a Haake torque rheometer/mixer, fitted with a glass viewport in order to visually inspect crystallization, with the mixing chamber preheated to 130° C. with rotor speed of 120 RPM in order to melt the prepolymer. The melt temperature was 170° C. When the prepolymer was melted, it begun to visually crystallize by turning an opaque white color. The material was samples at various times during the run and analyzed using DSC. At the first sampling time of 10 minutes, the material was at 19% crystalline.

Example 6
(heat crystallization in a Haake rheometer with subsequent solid state advancement)

The prepolymer was prepared and 1 cm nominal diameter particles obtained as in Example 4. 40 grams of the particles were placed in a Haake mixer preheated to about 145° C. with rotor speed of 120 RPM and melted. The temperature was controlled to keep the melt temperature below 185 ° C. The material was mixed for 60 minutes to obtain 25% crystallinity. The material was crushed and sieved to obtain 0.5–1 mm particles. These particles were solid state polymerized in a hopper dryer using nitrogen flow at 15 standard cubic feet per minute (SCFM) by heating to 180° C. for 30 minutes followed by a temperature ramp to 220° C. at 5° C./hour to achieve 30,000 MW in 30 hours.

Example 7
(heat crystallization with shear in a single-screw extruder with subsequent solid state advancement)

The prepolymer is prepared as in Example 1 with the following molecular weight and endgroup characteristics: MW=5900, Polydispersity=2.05, and hydroxyl endgroup content=2114 ppm. The % crystallinity is undetectable as determined by DSC.

The single-screw extruder used is a Haake Rheomex 254, Model no. 23-13-000 with nitrided 416 stainless steel barrel, vent port (blinded), 3 heating/cooling zones, and bin-type hopper. The screw is a venting, two-stage taper, 26-flight screw (cat no. 23-00-038) with 25:1 length to diameter ratio (L/D) and 0.75 inch diameter. The screw material is chrome-plated 4140 steel. The first screw stage has 10 feed flights, 3 compression flights, 4 metering flights and a channel depth ratio (feed depth/discharge depth) of 3. The second screw stage has 3 feed flights, 2 compression flights, 4 metering flights, and a channel depth ratio of 2.

The die assembly is a single, 4 cm long, horizontal capillary with a 3 mm opening. The die assembly is heated and controlled using a thermocouple. The temperature of the melt is measured using a thermocouple at the entrance to the die. The extruder is attached to a Haake EU-5V Rheocord with a 3:2 ratio gear box which powers the screw and allows torque measurement. The front section of the extruder is supported by a support stand to minimize weight-bearing stress at the drive coupling. A Camile System 2000 is used for data acquisition and process control. A catch pan supported on a cart was set in front and below the die opening to catch the processed prepolymer.

The extruder was initially heated to 280° C. for 30 minutes. The screw speed was raised from 0 to 120 RPM. The zone temperatures were then set at 200 ° C. The extruder was purged with 11,000 MW phenol-terminated polycarbonate to remove any high molecular weight material. The setpoints of heater zone temperatures and screw speed for processing the prepolymer are as follows: feed zone=190° C., middle zone=180° C., metering zone=180° C., die zone= 185 ° C., and screw speed=36 RPM. The screw speed was set at 35–100 RPM which was changed to control the generation of viscous heating (the cooling system was not set up at this time) which, in turn, controlled crystallinity of the output material. The prepolymer was fed as 5 mm average diameter particles. The output rate was estimated at 10–13 lb/hr. The final molecular weight was 5627 MW with 14.2 % crystallinity. Crystallinity content as high as 28% were measured during the run. The residence time of less than 1 minute was surprisingly low for the crystallinity content obtained in the output.

Solid state advancement of the crystallized prepolymer was carried out in a nitrogen flow semi-batch reactor system using a 3-inch diameter by 5-inch long stainless steel reactor. In the particle formation step, the extrudate strands were crushed in a glass mortar and pestle and sized as 75–500 $\mu$m particles on a CSC Scientific sieve shaker using U.S.A. Standard sieves. The reactor was filled with 10 grams of the particles.

The nitrogen flow and heating was started simultaneously. The nitrogen flow rate was 50 SCFM for 10 minutes (to facilitate initial heat-up) followed by 26 SCFM in the 3-inch reactor. The temperature profile is initial heating to 180° C. (taking ca. 25 minutes from ambient temperatures) followed by a temperature ramp of 10°0 C./hr to 240° C. with a total heating time of 10 hours. After the polymerization run, the particle samples were divided into 75–150 $\mu$m and 150–500 $\mu$m particle size ranges. For the 75–150 $\mu$m particle size range, the weight average molecular weight was measured as 31788 MW with a polydispersity of 2.2. For the 150–500 μm particle size range, the weight average molecular weight was measured as 35950 MW with a polydispersity of 2.3.

Example 8
(heat crystallization—combination of shear and static crystallization)

The prepolymer was prepared and 1 cm nominal diameter particles obtained as in Example 4. 40 grams of the particles were placed in a Haake mixer preheated to about 145° C. with a rotor speed of 120 RPM and melted. The temperature was controlled to keep the melt temperature below 185° C. Samples were taken at 2, 4, and 8 minutes of shear mixing time. A portion of each shear mixed sample was heated in a convection oven at 175° C. for 5, 10, 20, and 40 minutes. Samples of the prepolymer with no shear time in the mixer were heated in a convection oven at 180° C. for 2, 5, and 15 minutes. Table 1 shows prepolymer crystallinity as a function of shear times and static crystallization annealing times. In Table 1, "N/D" is for non-detectable by DSC and "–" means that no data is available. Refer to Example 4 for crystallization kinetics during heat crystallization without shear for longer static heating times. The combination of shear and static crystallization is much faster than static crystallization alone. Results are presented in Table 1 below.

TABLE 1

Prepolymer Crystallinity Results from Example 8

| Shear Time | Heating Time in Oven (min) | | | | | | |
|---|---|---|---|---|---|---|---|
| (min) | 0 | 2 | 5 | 10 | 15 | 20 | 40 |
| 0 | N/D | N/D | N/D | — | 4.1 | — | — |
| 2 | 6.356 | — | 17.34 | 18 | — | 18.4 | 21.29 |
| 4 | 3.3 | — | 18.38 | 15.38 | — | 19.38 | 16.34 |
| 8 | 17.51 | — | 17.24 | 16.92 | — | 15.94 | 13.93 |

We claim:

1. A method of crystallizing an aromatic polycarbonate prepolymer having a weight average molecular weight in the range of about 1,000 to above 20,000, and having in the range of about 5 to about 95 mole percent aryl carbonate terminal end groups based on total end groups, the method comprising:
   (a) crystallizing the prepolymer with a mixture of solvent and diluent to form crystallized prepolymer wherein the diluent serves to slow down the action of the solvent.

2. The method of claim 1 wherein the prepolymer is first obtained by contacting a dihydroxyaryl compound with a diaryl carbonate to form a polycarbonate prepolymer having a weight average molecular weight in the range of about 1,000 to about 20,000 and having in the in the range of about 5 to about 95 mole percent aryl carbonate terminal end groups based on total end groups.

3. The method of claim 2 wherein the solvent comprises at least one selected from the group consisting of aliphatic halogenated hydrocarbons, aromatic halogenated hydrocarbons, aromatic hydrocarbons, ethers, esters and ketones.

4. The method of claim 3 wherein the diluent is water.

5. The method of claim 4 wherein the solvent comprises at least one selected from the group consisting methyl chloride, methylene chloride, chloroform, carbon tetrachloride, chloroethane, dichloroethane, trichloroethane, trichloroethylene, tetrachloroethane, chlorobenzene, dichlorobenzene, benzene, toluene, xylene, tetrahydrofuran, dioxane, methyl acetate, ethyl acetate, acetone, and methyl ethyl ketone.

6. The method of claim 5 wherein the solvent comprises acetone.

7. The method of claim 5 further including heating the crystallized prepolymer to a reaction temperature above about the prepolymer glass transition temperature less 50° C. and suitable to maintain the crystallized prepolymer in a solid phase state throughout the solid phase during the formation of high molecular weight polycarbonate.

8. The method of claim 7 wherein the reaction temperature is increases during the formation of high molecular weight polycarbonate.

9. A method of making high molecular weight polycarbonate polymer from a polycarbonate prepolymer, said prepolymer having a weight average molecular weight in the range of about 1,000 to above 20,000, and said prepolymer having in the range of about 5 to about 95 mole percent aryl carbonate terminal end groups based on total end groups, the method comprising:
   (a) crystallizing the prepolymer with a mixture of solvent and diluent to form crystallized prepolymer wherein the diluent serves to slow down the action of the solvent; and
   (b) heating the crystallized prepolymer to a reaction temperature above about the prepolymer glass transition temperature less 50° C. and suitable to maintain the crystallized prepolymer in a solid phase state throughout the solid phase during the formation of high molecular weight polycarbonate.

10. The method of claim 9 wherein the prepolymer is first obtained by contacting a dihydroxy aryl compound with a diaryl carbonate to form a polycarbonate prepolymer having weight average a molecular weight in the range of about 1,000 to about 20,000 and having in the in the range of about 5 to about 95 mole percent aryl carbonate terminal end groups based on total end groups.

11. The method of claim 10 wherein the reaction temperature is in the range of about the polymer glass transition temperature less 50° C. and 350° C.

12. The method of claim 11 wherein the diluent is water, and the solvent comprises at least one selected from the group consisting of aliphatic halogenated hydrocarbons, aromatic halogenated hydrocarbons, aromatic hydrocarbons, ethers, esters and ketones.

13. The method of claim 12 wherein the solvent comprises acetone.

14. The method of claim 10 wherein the reaction temperature is increased during the formation of high molecular weight polycarbonate.

15. The method of claim 14 wherein the diluent is water, and wherein the solvent comprises at least one selected from the group consisting methyl chloride, methylene chloride, chloroform, carbon tetrachloride, chloroethane, dichloroethane, trichloroethane, trichloroethylene, tetrachloroethane, chlorobenzene, dichlorobenzene, benzene, toluene, xylene, tetrahydrofuran, dioxane, methyl acetate, ethyl acetate, acetone, and methyl ethyl ketone.

16. The method of claim 15 wherein the solvent comprises acetone.

17. A method of crystallizing an aromatic polycarbonate prepolymer having a weight average molecular weight in the range of about 1,000 to above 20,000, and having in the range of about 5 to about 95 mole percent aryl carbonate terminal end groups based on total end groups, the method comprising:
   (a) crystallizing the prepolymer by application of a shearing force and at a temperature in the range of the prepolymer glass transition temperature less 50° C. and the prepolymer melt temperature.

18. The method of claim 17 wherein the prepolymer is first obtained by contacting a dihydroxy aryl compound with a diaryl carbonate to form a polycarbonate prepolymer having a weight average molecular weight in the range of about 1,000 to about 20,000 and having in the in the range of about 5 to about 95 mole percent aryl carbonate terminal end groups based on total end groups.

19. The method of claim 18 wherein the shearing force is applied at the rate of about 1 to about 10,000 cycles per second.

20. A method of making high molecular weight polycarbonate polymer from a polycarbonate prepolymer, said prepolymer having a weight average molecular weight in the range of about 1,000 to above 20,000, and said prepolymer having in the range of about 5 to about 95 mole percent aryl carbonate terminal end groups based on total end groups, the method comprising:
  (a) crystallizing the prepolymer by application of a shearing force and at a temperature in the range between the prepolymer glass transition temperature less 50° C. and the prepolymer melt temperature; and
  (b) heating the crystallized prepolymer to a reaction temperature greater than the prepolymer glass transition temperature less 50° C. and suitable to maintain the crystallized prepolymer in a solid phase state throughout the solid phase during the formation of high molecular weight polycarbonate.

21. The method of claim 20 wherein the prepolymer is first obtained by contacting a dihydroxy aryl compound with a diaryl carbonate to form a polycarbonate prepolymer having a weight average molecular weight in the range of about 1,000 to about 20,000 and having in the in the range of about 5 to about 95 mole percent aryl carbonate terminal end groups based on total end groups.

22. The method of claim 21 wherein the reaction temperature is in the range of about the polymer glass transition temperature less 50° C. and 350° C., and the shearing force is applied at a rate in the range of about 1 to about 10,000 cycles per second.

23. The method of claim 22 wherein the diluent is water, and the solvent comprises at least one selected from the group consisting of aliphatic halogenated hydrocarbons, aromatic halogenated hydrocarbons, aromatic hydrocarbons, ethers, esters and ketones.

24. The method of claim 23 wherein the solvent comprises acetone.

25. The method of claim 21 wherein the reaction temperature is increased during the formation of high molecular weight polycarbonate, and wherein the shear force is applied at a rate in the range of about 100 to about 500 cycles per second.

26. The method of claim 25 wherein the diluent is water, and wherein the solvent comprises at least one selected from the group consisting methyl chloride, methylene chloride, chloroform, carbon tetrachloride, chloroethane, dichloroethane, trichloroethane, trichloroethylene, tetrachloroethane, chlorobenzene, dichlorobenzene, benzene, toluene, xylene, tetrahydrofuran, dioxane, methyl acetate, ethyl acetate, acetone, and methyl ethyl ketone.

27. The method of claim 26 wherein the solvent comprises acetone.

28. A method of crystallizing an aromatic polycarbonate prepolymer having a weight average molecular weight in the range of about 1,000 to above 20,000, and having in the range of about 5 to about 95 mole percent aryl carbonate terminal end groups based on total end groups, the method comprising:
  (a) application of a shearing force to the prepolymer to form oriented prepolymer; and
  (b) heating the oriented prepolymer to a temperature between the prepolymer glass transition temperature less 50° C. and the prepolymer melt temperature to crystallize the prepolymer.

29. The method of claim 28 wherein the prepolymer is first obtained by contacting a dihydroxy aryl compound with a diaryl carbonate to form a polycarbonate prepolymer having a weight average molecular weight in the range of about 1,000 to about 20,000 and having in the in the range of about 5 to about 95 mole percent aryl carbonate terminal end groups based on total end groups.

30. The method of claim 29 wherein the reaction temperature is in the range of about the polymer glass transition temperature less 50° C. and 350° C., and the shearing force is applied at a rate in the range of about 1 to about 10,000 cycles per second.

31. The method of claim 30 wherein the diluent is water, and the solvent comprises at least one selected from the group consisting of aliphatic halogenated hydrocarbons, aromatic halogenated hydrocarbons, aromatic hydrocarbons, ethers, esters and ketones.

32. The method of claim 31 wherein the solvent comprises acetone.

33. The method of claim 29 wherein the reaction temperature is increased during the formation of high molecular weight polycarbonate, and wherein the shear force is applied at a rate in the range of about 100 to about 500 cycles per second.

34. The method of claim 33 wherein the diluent is water, and wherein the solvent comprises at least one selected from the group consisting methyl chloride, methylene chloride, chloroform, carbon tetrachloride, chloroethane, dichloroethane, trichloroethane, trichloroethylene, tetrachloroethane, chlorobenzene, dichlorobenzene, benzene, toluene, xylene, tetrahydrofuran, dioxane, methyl acetate, ethyl acetate, acetone, and methyl ethyl ketone.

35. The method of claim 34 wherein the solvent comprises acetone.

36. A method of making high molecular weight polycarbonate polymer from a polycarbonate prepolymer, said prepolymer having a weight average molecular weight in the range of about 1,000 to above 20,000, and said prepolymer having in the range of about 5 to about 95 mole percent aryl carbonate terminal end groups based on total end groups, the method comprising:
  (a) application of a shearing force to the prepolymer to form oriented prepolymer; and
  (b) heating the oriented prepolymer to a temperature between the prepolymer glass transition temperature and the prepolymer melt temperature to form crystallized prepolymer; and
  (c) heating the crystallized prepolymer to a reaction temperature greater than the prepolymer glass transition temperature less 50° C. and suitable to maintain the crystallized prepolymer in a solid phase state throughout the solid phase during the formation of high molecular weight polycarbonate.

37. The method of claim 36 wherein the prepolymer is first obtained by contacting a dihydroxy aryl compound with a diaryl carbonate to form a polycarbonate prepolymer having a weight average molecular weight in the range of about 1,000 to about 20,000 and having in the in the range of about 5 to about 95 mole percent aryl carbonate terminal end groups based on total end groups.

* * * * *